UNITED STATES PATENT OFFICE 2,110,873

HYDRATION OF OLEFINES AND CATALYST THEREFOR

Walter Philip Joshua, Cheam, Herbert Muggleton Stanley, Tadworth, and John Blair Dymock, Sutton, England No Drawing. Application October 4, 1933, Serial No. 692,222. In Great Britain November 3, 1932

20 Claims. (Cl. 260—156)

The present invention relates to the preparation of catalysts suitable for accelerating the combination of olefines and water vapor to form the corresponding alcohols. The mechanical stability of the catalyst is of the utmost importance when high partial pressures of steam are used at high temperatures.

According to the present invention catalysts suitable for the hydration of olefines are produced in a mechanically stable form, without their activity being impaired, by incorporating with the active catalytic material during preparation of the catalyst a drying oil, such as linseed oil, and by subsequently subjecting the mixture to heat treatment. The amount of oil added is preferably not more than 20 per cent by weight of the catalytic materials employed in the preparation of the catalyst.

The above-described method of preparation is particularly applicable to catalysts containing an excess of phosphoric acid over and above the amount required to form the orthophosphate of the element or elements employed. When attempt is made to use catalytic material containing relatively large amounts of phosphoric acid under conditions of high partial steam pressure such as is required at total working pressures between 20 and 100 atmospheres without first preparing the material as above described, it tends to break down mechanically. The mechanical stability of such material could be improved by decreasing the amount of phosphoric acid present in it, but we have found that this reduces materially the activity of the material and diminishes the amount of alcohol which can be produced per unit volume of such material in unit time.

The following examples illustrate the manner in which the invention may be carried into effect and results obtained by their uses:—

Example I

A mixture of one gm. mol. of manganese carbonate, half a gm. mol. of boric anhydride and 3.6 gm. mols of orthophosphoric acid are digested with water and during the evaporation 18.5 gms. of raw linseed oil are added and at the point of solidification the mass is violently stirred. The resulting mass is then baked at 200° C. and after grinding, a further 3% of raw linseed oil is added and the mass tabletted and the tablets baked at 200° C. for one to two hours. Over the catalyst so prepared and at a temperature of 270° C. ethylene and steam were passed at a total pressure of 20 atmospheres, the steam pressure being 6 atmospheres. A yield of 10.2 grams of alcohol per 100 ccs. of catalyst was obtained per hour. Using 40 atmospheres total pressure, and a temperature of 290° C., the steam pressure being 10 atmospheres, the yield of ethyl alcohol was 46 grams per 100 ccs. of catalyst per hour. After 72 hours of running the catalyst had suffered no deterioration whatever.

Example II

In place of the 18.5 grams of linseed oil mentioned in Example I tung oil to the extent of 18.5 grams was used in the first stage. After baking at 250° C. the mass was ground with 3% of linseed oil and was tabletted, and the tablets were baked at 200° C. When ethylene and steam were passed over this catalyst under the afore-mentioned conditions at 270° C. and 20 atmospheres, 8.9 grams of alcohol per 100 cc. of catalyst were obtained per hour. Using a total pressure of 40 atmospheres and 290° C. the yield of alcohol was 11.06 grams per 100 ccs. of catalyst per hour. After 72 hours continuous running the catalysts had suffered no deterioration whatever.

Although applicable for the preparation of catalysts containing an excess of phosphoric acid this method of preparation can equally be applied to other catalytic materials containing an excess of acidic radical, for example tungstic acid and the like.

It is one of the advantages of the invention that by baking the composite catalyst body prepared in the manner described there is formed a carbonaceous residue which seems to give mechanical stability or structural strength to the catalyst so that it maintains substantially all of its physical and chemical characteristics during long periods of use in the catalytic conversion of olefines and water vapor into the corresponding alcohols.

What we claim is:—

1. The process of catalytically converting olefines into alcohols which comprises passing a mixture of the olefine and water vapor at elevated temperatures and pressures over a catalyst comprising essentially a solid hydration catalytic material and the intimately dispersed carbonaceous residue of a drying oil resulting from mixing said material and the drying oil and heating the mixture.

2. The process of catalytically converting olefines into alcohols which comprises passing a mixture of the olefine and water vapor at elevated temperatures and pressures over a catalyst comprising essentially a solid hydration catalytic material and the intimately dispersed carbonaceous residue of linseed oil resulting from mixing said material and the oil and heating the mixture.

3. The process of catalytically converting olefines into alcohols which comprises passing a mixture of the olefine and water vapor at elevated temperatures and pressures over a catalyst comprising essentially a solid hydration catalytic material and the intimately dispersed carbonaceous residue of tung oil resulting from mixing said material and the oil and heating the mixture.

4. The process of catalytically converting olefines into alcohols which comprises passing a mixture of the olefine and water vapor at elevated temperatures and pressures over a catalyst comprising essentially a solid hydration catalytic material and the intimately dispersed carbonaceous residue of linseed oil and tung oil resulting from mixing said material and the oils and heating the mixture.

5. The process of catalytically converting olefines into alcohols which comprises passing a mixture of the olefine and water vapor at elevated temperatures and pressures over a catalyst comprising essentially a solid hydration catalytic material and the intimately dispersed carbonaceous residue of a drying oil resulting from mixing said material with up to 20 per cent by weight of said oil and heating the mixture.

6. The process of catalytically converting olefines into alcohols which comprises passing a mixture of the olefine and water vapor at elevated temperatures and pressures over a catalyst comprising essentially a solid inorganic hydration catalytic phosphate and the intimately dispersed carbonaceous residue of a drying oil resulting from mixing said phosphate and the drying oil and heating the mixture.

7. The process of catalytically converting olefines into alcohols which comprises passing a mixture of the olefine and water vapor at elevated temperatures and pressures over a catalyst comprising essentially a solid inorganic hydration catalytic phosphate and the intimately dispersed carbonaceous residue of linseed oil resulting from mixing said phosphate and linseed oil and heating the mixture.

8. The process of catalytically converting olefines into alcohols which comprises passing a mixture of the olefine and water vapor at elevated temperatures and pressures over a catalyst comprising essentially a solid inorganic hydration catalytic phosphate and the intimately dispersed carbonaceous residue of tung oil resulting from mixing said phosphate and tung oil and heating the mixture.

9. The process of catalytically converting olefines into alcohols which comprises passing a mixture of the olefine and water vapor at elevated temperatures and pressures over a catalyst comprising essentially a solid inorganic hydration catalytic phosphate and excess phosphoric acid and the intimately dispersed carbonaceous residue of a drying oil resulting from mixing the aforesaid materials and heating the mixture.

10. The process of catalytically converting olefines into alcohols which comprises passing a mixture of the olefine and water vapor at elevated temperatures and pressures over a catalyst comprising essentially pellets of intimately admixed inorganic hydration catalytic phosphate, excess phosphoric acid, and the carbonaceous residue of a drying oil charred in situ.

11. The process of catalytically converting olefines into alcohols which comprises passing a mixture of the olefine and water vapor at elevated temperatures and pressures over a catalyst prepared by making an inorganic hydration catalytic phosphate containing phosphoric acid in excess of that necessary to form the orthophosphate, incorporating a drying oil in the composition and baking same.

12. The process of catalytically converting olefines into alcohols which comprises passing a mixture of the olefine and water vapor at elevated temperatures and pressures over a catalyst prepared by making an inorganic hydration catalytic phosphate containing phosphoric acid in excess of that necessary to form the orthophosphate, incorporating linseed oil in the composition and baking same.

13. The process of catalytically converting olefines into alcohols which comprises passing a mixture of the olefine and water vapor at elevated temperatures and pressures over a catalyst prepared by making an inorganic hydration catalytic phosphate containing phosphoric acid in excess of that necessary to form the orthophosphate, incorporating linseed oil in the composition and tabletting and baking same.

14. The process of catalytically converting olefines into alcohols which comprises passing a mixture of the olefine and water vapor at elevated temperatures and pressures over a catalyst prepared by making an inorganic hydration catalytic phosphate containing phosphoric acid in excess of that necessary to form the orthophosphate, incorporating linseed oil in the composition, then baking and grinding same, and finally tabletting with additional linseed oil and rebaking.

15. The process of catalytically converting olefines into alcohols which comprises passing a mixture of the olefine and water vapor at elevated temperatures and pressures over a catalyst prepared by making an inorganic hydration catalytic phosphate containing phosphoric acid in excess of that necessary to form the orthophosphate, incorporating tung oil in the composition, then baking and grinding same, and finally tabletting with additional tung oil and rebaking.

16. A hydration catalyst for the hydration of olefines comprising essentially a solid hydration catalytic material and having dispersed therein by production in situ the carbonaceous residue of a drying oil whereby the physical structure of the catalyst may be maintained substantially constant under elevated temperatures and pressures.

17. A hydration catalyst for the hydration of olefines comprising essentially a solid hydration catalytic material and having dispersed therein by production in situ a carbonaceous residue of a substance taken from a group consisting of linseed oil and tung oil whereby the physical character of the catalyst may be maintained substantially constant under elevated temperatures and pressures.

18. A hydration catalyst for the hydration of olefines comprising essentially a solid hydration catalytic material and having dispersed therein the carbonaceous residue of linseed oil by production in situ whereby the physical structure of the catalyst may be maintained substantially constant under elevated temperatures and pressures.

19. A hydration catalyst for the hydration of olefines comprising essentially a solid hydration catalytic material and having dispersed therein the carbonaceous residue of tung oil by production in situ whereby the physical structure of the catalyst may be maintained substantially constant under elevated temperatures and pressures.

20. A hydration catalyst for the hydration of olefines comprising essentially a solid hydration catalytic material and having dispersed therein the carbonaceous residue of linseed oil and tung oil by production in situ whereby the physical structure of the catalyst may be maintained substantially constant under elevated temperatures and pressures.

WALTER PHILIP JOSHUA.
HERBERT MUGGLETON STANLEY.
JOHN BLAIR DYMOCK.